June 8, 1943.                    E. R. MORANDO                    2,321,232
                         HANDY PARCEL CARRIER FOR BABY
                              CARRIAGES AND THE LIKE
                              Filed Feb. 24, 1942
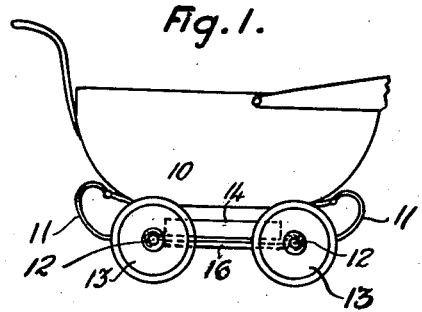
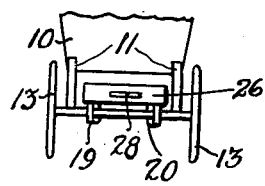
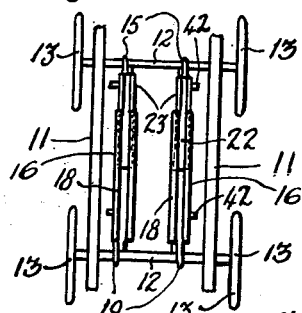
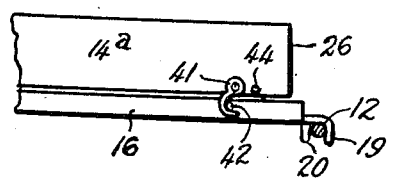
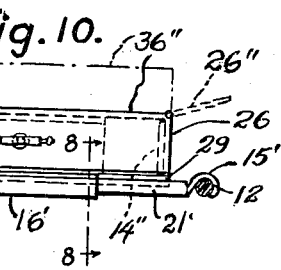
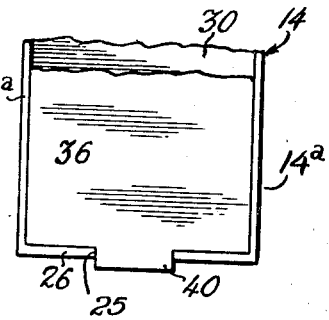
INVENTOR·
EMANUEL R. MORANDO
BY
his ATTORNEY Patented June 8, 1943

2,321,232

UNITED STATES PATENT OFFICE 2,321,232

HANDY PARCEL CARRIER FOR BABY CARRIAGES AND THE LIKE

Emanuel R. Morando, New York, N. Y.

Application February 24, 1942, Serial No. 432,109

3 Claims. (Cl. 224—29)

This invention relates to carriages or conveyances, especially to baby carriages, and has particular reference to attachments therefor, in the form of utility containers or parcel carriers, although the invention is not thus limited.

Heretofore the problem of shopping or purchasing articles or parcels, and carrying them, while at the same time using or pushing a baby carriage, has been absorbing, and the primary object of this invention is the provision of holding means, in association with such carriage, by which the function of shopping and carrying parcels and the like may be greatly simplified. It has been found that practically every baby carriage of the type now being considered, has therein certain open and available space, and therefore, it is desired to utilize such space for carrying the parcels in a tray, basket or box therein.

Another object of the invention is a parcel container of the telescopic box type, which finds a place in the aforesaid open space, and yet other objects of the invention reside in the provision of novel means for removably associating the parcel container with existing carriage structures.

Carriages invariably have wheels with two axles, above which the body of the carriage, in spring supported condition, is positioned, leaving a very considerable space between the axle bars and carriage bottom. Since the package carrier of this invention, which is slidable into and out of place below the carriage body, may house articles other than those purchased as above indicated, it follows that greater utility becomes involved.

With the above indicated objects and advantages in view, as well as others which will hereinafter appear, this invention resides in certain novel constructions and arrangements of parts, the essential features of which are herein fully described, and illustrated in the accompanying drawing, in which:

Figure 1 is a diagrammatic side elevation of a carriage with which the instant improvements are incorporated;

Figure 2 is a fragmentary back view thereof;

Figure 3 is a fragment plan view of carriage, showing the extendible supporting frame members of the new attachment therewith;

Figure 4 is an enlarged top plan view of a parcel carrier or receptacle, such as an open basket or tray;

Figure 5 is an end view of Fig. 4;

Figure 6 is a fragmentary top plan view, similar to Fig. 4, showing a top or cover on the carrier;

Figure 7 is a fragmentary elevational view of one end portion of the carrier showing the locking means.

Figure 8 is a fragmentary cross-sectional view on line 8—8 of Figure 10.

Figure 9 shows a similar view as Figure 7, with extended hook end portions of frame members for low axles.

Figure 10 shows an adjustable basket or box container, that may be extended longitudinally and vertically.

Figure 11 is a perspective view of a hinged basket, or box.

Referring to said drawing, a conventional baby carriage includes a body 10, which is supported by springs 11 onto the axles 12 and on the wheels 13, thereby leaving a considerable interposed space, as shown, in which may be disposed a basket, tray, or container 14, said axles having thereon hooks 15 and 19, each of which forms the end portion of a telescoping track arrangement, in which there are two rails forming the track frame, each of which may be substantially like the other, so that a description of one is equally applicable to the other.

The track for the box rails, see Figures 3 and 8, includes an outer channel member 16, having a web 17 and two flanges 17a, each having on its upper edge margin a reduced right angular, or turned in flange 18. From the web 17 extends a hook element 19, which is secured onto one of the axles 12, and an inner element 20 which rests against the inner side of the axle. Slidably mounted into the channel member 16, is another channel member 21, having a web 22 and side flanges 23, these latter flanges having their top parts movable under or along the turned in flanges 18 of the outer channel member 16.

The aforesaid hook element 15 extends from the web 22 and clamps onto the other axle 12 at the top thereof. An inner hook element 19b of Figure 9, is for the same purpose as the element 20 in Figure 7, and therefore, the inner channel member 21 may be instantly secured or locked on the other axle 12. By means of the relatively slidable channel members of the longitudinal tracks, the latter may be fitted onto the axles of any carriage, within ordinary limits, it being seen that the outer members 16 are relatively long, and the members 21, short, to allow extension or lengthwise contraction.

The box or container 14, may be made of any material, such as sheet material, wire mesh, or wood, and has side walls 14a and end walls 26, which are alike, and each end wall 26, as herein constructed, may or may not have an angular recess 25, each of said end walls 26 having thereon a handle 28.

To the bottom 30 of the box 14 is attached, as by rivets 31, a rail or runner 29 having a web 32, and each runner is also like the other, there being two such runners. A flange 33 of the runner or I shape rail member 32 receives the rivets 31, and a lowermost flange 34 of said runner is of such dimensions as to pass between the flanges 17, 17a, 18 and 23 into the telescoped channel members 16 and 21. The rivets 31, however, have their heads flush with the surface of the double flange 33, the latter being therefore, capable of suitably resting on the flanges 18.

The box 14 may be of any length, consistent with the distance between the axles of the carriage, one particular length, which may be a medium, being herein selected for illustration. The box 14, as by its handles 28, is readily manipulative, with articles therein, for placing the rails 29 in the channels or tracks, or for removing said rails from the tracks A cover 36 may be used on the box 14, and this cover is so arranged as to take up no space above the top edges of said box. The cover 36 consists of a panel, which fits between the walls 14a and 26 of the box, and on said panel are integral extensions 40, one at each end, which fit into the recesses 25. The portions 40 serve as handles for the cover, since they extend slightly beyond the end walls of the box, but not so far as to interfere with the handles 28. However, if so desired the cover may be otherwise constructed, for example, an alternative box form as shown in Figure 10, in which the box or receptacle and cover are slidable longitudinally as shown in the dot and dash positions. Similar parts have same numerals as original parts, with the numerals primed accordingly. The telescoping portions 14'—14" and covers 36'—36", may extend beyond the axles 12 and the wheel base, if necessary, and be secured by any suitable means as convenient.

On each side of the box 14, at each end thereof, may be a pivoted hook 41, and to coact with these hooks the flanges 17a and 23 of the channel members 16 and 21 are provided with pins 42, to which the hooks 41 may be holdingly coupled. During insertion and removal of a box 14 into or from its place below the body 10, the hooks 41 may be thrown into idle position, rest pins, as 44, being provided for this purpose. Only one pin 44, Fig. 7, is at present shown.

In Fig. 11, a basket or box 14a' is shown, having fixed hinged covers 36''' that open as per dot-dash lines at either end. This allows the removal of contents in the limited space under the carriage. However, the ends may be hinged also and open as per dot-dash lines shown at 26'' in Fig. 10.

Variations may be resorted to within the scope of this invention, and parts of the improvements may be used that come within the scope of the appended claims.

Having thus described my invention, what I claim as new and desire to secure by Letters Patent of the United States, is as follows:

1. In a parcel carrier of the character described, including a pair of telescopic frame members of channel-like construction, one slidable within the other, the inner channel members having hook portions on their outer free ends, and the other channel members having also hook portions at their free ends, the free edges of the sides of said channel extending upwardly, a box receptacle having telescopic portions with side walls, end walls and bottom portions, track members of I shape construction suitably spaced apart and secured to the bottom and adjacent the side walls of the outer telescopic portion of said box receptacle, said hook portions of said channel members adapted to be suspended from the front and rear axles of a baby carriage, said track members insertable and slidable into said channel members, and means to lock said box portions to said suspended channel members.

2. In a parcel carrier for baby carriages, outer spaced parallel channel members with turned-in flanges and having means at their free ends to engage one axle of the carriage, inner similar spaced channel members inserted and extended within said outer members and provided with means at their free ends to engage the other axle of said carriage, the sides of said channel extending upwardly, a basket or box member provided on its bottom with spaced I shape rail members adapted to be slidable within said channel members, the upper flanges of the rail members being secured to the bottom of the basket or box member, and resting upon said turned-in flanges, hooks on said basket or box member engaging pins secured to said channel members, and a removable cover member on said basket or box.

3. In a parcel carrier for baby carriages, outer spaced and upwardly open parallel channel members having means at their free ends to engage one axle of the carriage, inner similar spaced members inserted and adapted for telescoping movement within said outer members and provided with means at their free ends to engage the other axle of said carriage, a basket or box member provided on its bottom with rail members engaged and slidable within said channel members, means to secure said basket or box and its rail members to said channel members, and a removable cover member on said basket or box member.

EMANUEL R. MORANDO.